United States Patent
Newport

[19]

[11] Patent Number: 5,988,328
[45] Date of Patent: Nov. 23, 1999

[54] SPRING SET CENTRIFUGALLY RELEASED BRAKE

[75] Inventor: Samuel O. Newport, Beloit Rock, Wis.

[73] Assignee: Dana Corporation, Toledo, Ohio

[21] Appl. No.: 09/040,004

[22] Filed: Mar. 17, 1998

[51] Int. Cl.[6] .................................................. B60T 8/72
[52] U.S. Cl. ........................................ 188/186; 188/166
[58] Field of Search .................................. 188/186, 185, 188/184, 180, 189, 162, 74–76, 82.1, 134, 166, 167; 74/89.15, 424.8 R; 310/13, 23; 254/375, 378; 192/141; 303/115.2, 162

[56]    References Cited

U.S. PATENT DOCUMENTS

| | | | |
|---|---|---|---|
| 300,647 | 6/1884 | Sharp | 188/186 |
| 1,658,561 | 2/1928 | Kennington | 188/186 |
| 1,851,718 | 3/1932 | Merle | 188/186 |
| 2,295,503 | 9/1942 | Miller | 188/186 |
| 2,808,905 | 10/1957 | Bohl | 188/184 |
| 3,061,052 | 10/1962 | Hoppe et al. | 188/186 |
| 3,415,343 | 12/1968 | Svensson | 187/19 |
| 4,044,969 | 8/1977 | Wallin | 242/107.4 A |
| 4,121,702 | 10/1978 | Kaufmann | 188/187 |
| 4,219,107 | 8/1980 | Ford | 188/134 |
| 4,277,036 | 7/1981 | Seifert et al. | 242/107.4 A |
| 4,282,953 | 8/1981 | Lichti et al. | 188/189 |
| 4,369,932 | 1/1983 | Seifert et al. | 242/107.4 A |
| 4,448,290 | 5/1984 | Reid, Jr. et al. | 188/82.7 |
| 4,582,179 | 4/1986 | Nelson | 188/184 |
| 4,856,623 | 8/1989 | Romig, Jr. | 188/180 |
| 5,222,578 | 6/1993 | Thorp | 187/19 |
| 5,809,833 | 9/1998 | Newport et al. | 74/89.15 |

*Primary Examiner*—Douglas C. Butler
*Attorney, Agent, or Firm*—Dykema Gossett PLLC

[57]    ABSTRACT

A spring-set, centrifugally released brake for a linear actuator is provided. The brake includes a drum or ring that is disposed radially outward of a shaft extending from the actuator's motor. The brake also includes a drive plate that is mounted to the shaft for rotation therewith. The brake further includes a pair of brake shoes disposed radially outwardly of the shaft and having radially outer portions disposed radially outwardly of the drum. Finally, the brake includes a pair of compression springs disposed within hollows in the drive plate. The springs are supported at one end by the drive plate and at the other end by one of the brake shoes. The springs urge the brake shoes radially inward when the actuator is at rest and cause the radially outer portions of the brake shoes to engage a radially outer surface of the drum. Upon rotation of the shaft by the actuator motor, a centrifugal force is imparted to the brake shoes and the radially outer portions of the brake shoes move radially outward—disengaging from the radially outer surface of the drum—to release the brake.

17 Claims, 3 Drawing Sheets

SPRING SET CENTRIFUGALLY RELEASED BRAKE

BACKGROUND OF THE INVENTION

1. Field of the Invention

This invention relates to brakes, and, more particularly, to a spring-set, centrifugally released brake for use in a linear actuator.

2. Disclosure of Related Art

In a linear actuator, a brake is often used to prevent "back driving" of the actuator when the actuator is at rest under an axial load (i.e., a load or force applied to an extension tube of the actuator along an axis of the extension tube). Such brakes are particularly useful in linear actuators that incorporate anti-friction bearings. Anti-friction bearings are desirable for use in linear actuators because they enable more efficient movement of loads. One disadvantage of anti-friction bearings, however, is that they increase the likelihood of "back driving" of the actuator. As a result, linear actuators that incorporate anti-friction bearings require an increased braking force to hold an axial load while the actuator is at rest. The application of this increased braking force produces a large friction brake drag that adds to the load of the actuator's motor when the actuator is in operation.

Conventional brakes used in linear actuators—both those with and without anti-friction bearings—also suffer from other deficiencies. First, the brakes are often expensive and require numerous parts. Second, the operation of the brakes is often complex and inefficient. For example, electrical power is often utilized to release the brake.

There is thus a need for a brake that will minimize or eliminate one or more of the above-mentioned deficiencies.

SUMMARY OF THE INVENTION

The present invention provides a spring-set, centrifugally released brake for use in a linear actuator.

An object of the present invention is to provide a brake that is able to hold a predetermined axial load when power is removed from the driving motor of the actuator and the actuator is at rest.

A second object of the present invention is to provide a brake that will fully release when the actuator is not at rest, thereby eliminating any friction brake drag that would otherwise add to the load of the actuator's motor.

A brake in accordance with the present invention is adapted to "brake" a shaft of an actuator motor of a linear actuator. The brake includes an annular member, such as a drum or ring, that is disposed radially outwardly of a shaft extending from the actuator's driving motor. The annular member may be mounted to the motor's housing. The brake also includes a drive plate that is mounted to the shaft for rotation therewith. The brake further includes a brake shoe that is disposed radially outwardly of the shaft and has a first portion that is disposed radially outwardly of the annular member. Finally, the brake includes means, such as a compression spring connected between the drive plate and brake shoe, for urging the brake shoe radially inwardly so that the first portion of the brake shoe engages a radially outer surface of the annular member. The brake is released upon startup of the actuator motor. The motor rotates the shaft and imparts a centrifugal force to the brake shoe, thereby causing the first portion of the brake shoe to move radially outwardly and to disengage from the radially outer surface of the annular member.

One advantage of a brake in accordance with the present invention is that it is less expensive than conventional brakes and requires fewer parts.

Another advantage of a brake in accordance with the present invention is that its operation is less complex and more efficient than conventional brakes (e.g., brakes that utilize electrical power to release the brake).

Yet another advantage of the present invention is that it makes it easier to incorporate anti-friction bearings into linear actuators to thereby increase the operational efficiency of the actuators.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
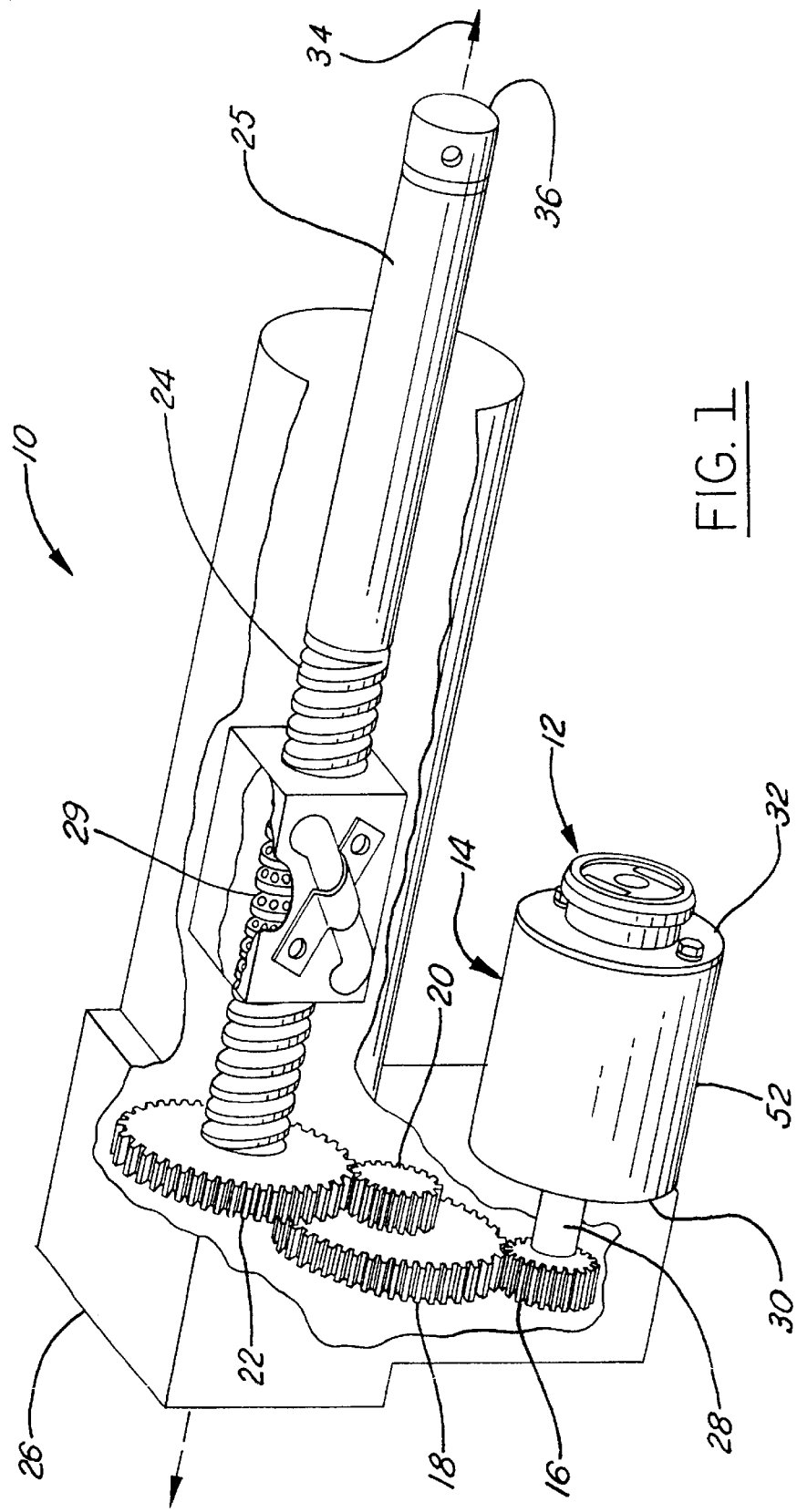
FIG. 1 is a perspective view of a linear actuator incorporating a brake in accordance with the present invention.

Referring now to the drawings wherein like reference numerals are used to identify identical components in the various views, FIG. 1 illustrates a linear actuator 10 incorporating a brake 12 in accordance with the present invention. Actuator 10 may also include a motor 14, means for moving an axial load (not shown)—such as gears 16, 18, 20, and 22, lead screw 24, and an extension tube 25—and a housing 26.

Motor 14 is provided to generate power to control the movement of gears 16, 18, 20, and 22, lead screw 24 and extension tube 25. Motor 14 is conventional in the art. Motor 14 includes a shaft 28 extending from a first end 30 of motor 14. Shaft 28 may be connected to gear 16. Shaft 28 may also extend from a second end 32 of motor 14.

Gears 16, 18, 20, and 22 are provided to transmit torque generated by motor 14 to lead screw 24. Gears 16, 18, 20, and 22 may comprise gear configurations that are conventional in the art and may be made from conventional alloys of well-known metals. In the illustrated example, four gears are use to transmit torque from motor 14 to lead screw 24, with gears 16 and 18 in mesh and gears 20 and 22 in mesh, respectively. It should be understood, however, that varying numbers of gears may be used within actuator 10. For example, gears 18 and 20 could be eliminated and gear 16 could be made to mesh with gear 22. As mentioned hereinabove, gear 16 is connected to shaft 28 of motor 14. Gear 22 is connected to lead screw 24 and rotation of gear 22 results in rotation of lead screw 24 causing movement of extension tube 25 along axis 34.

Lead screw 24 is provided to move extension tube 25 along axis 34 responsive to rotation of shaft 28 by motor 14. Lead screw 24 is conventional in the art and, in the illustrated embodiment, comprises a ball-bearing screw having anti-friction bearings 29.

Extension tube 25 is provided to hold and move a load (not shown) along axis 34. The load may be mounted to tube 25 at one end 36 thereof. Specifically, end 36 may be configured to be connected to the load. Tube 25 may comprise a conventional tube known in the art and may be made from stainless steel.

Housing 26 is provided to protect the internal components of actuator 10 from contamination by foreign objects and elements. Housing 26 is also provided to support the gearing and to prevent the loss of lubricants from actuator 10. Housing 26 is conventional in the art and may be made from a variety of conventional metals and/or plastics.

It should be understood that the linear actuator in FIG. 1 only illustrates several basic components of a conventional actuator. Actuator 10 may, for example, also include an electronic control unit for controlling actuator 10.

Figure 2:
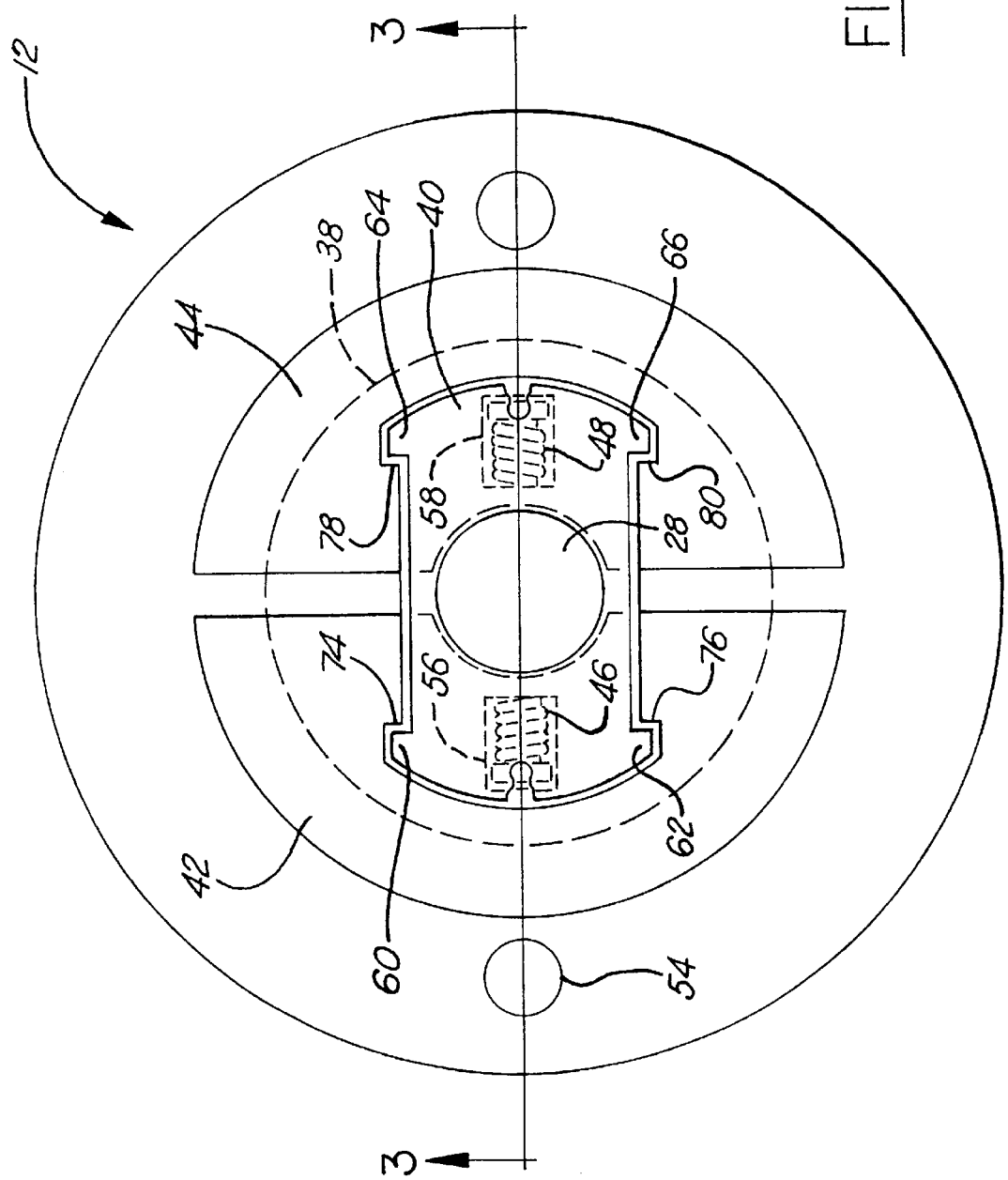
FIG. 2 is a top plan view of a brake in accordance with the present invention.
Figure 3:
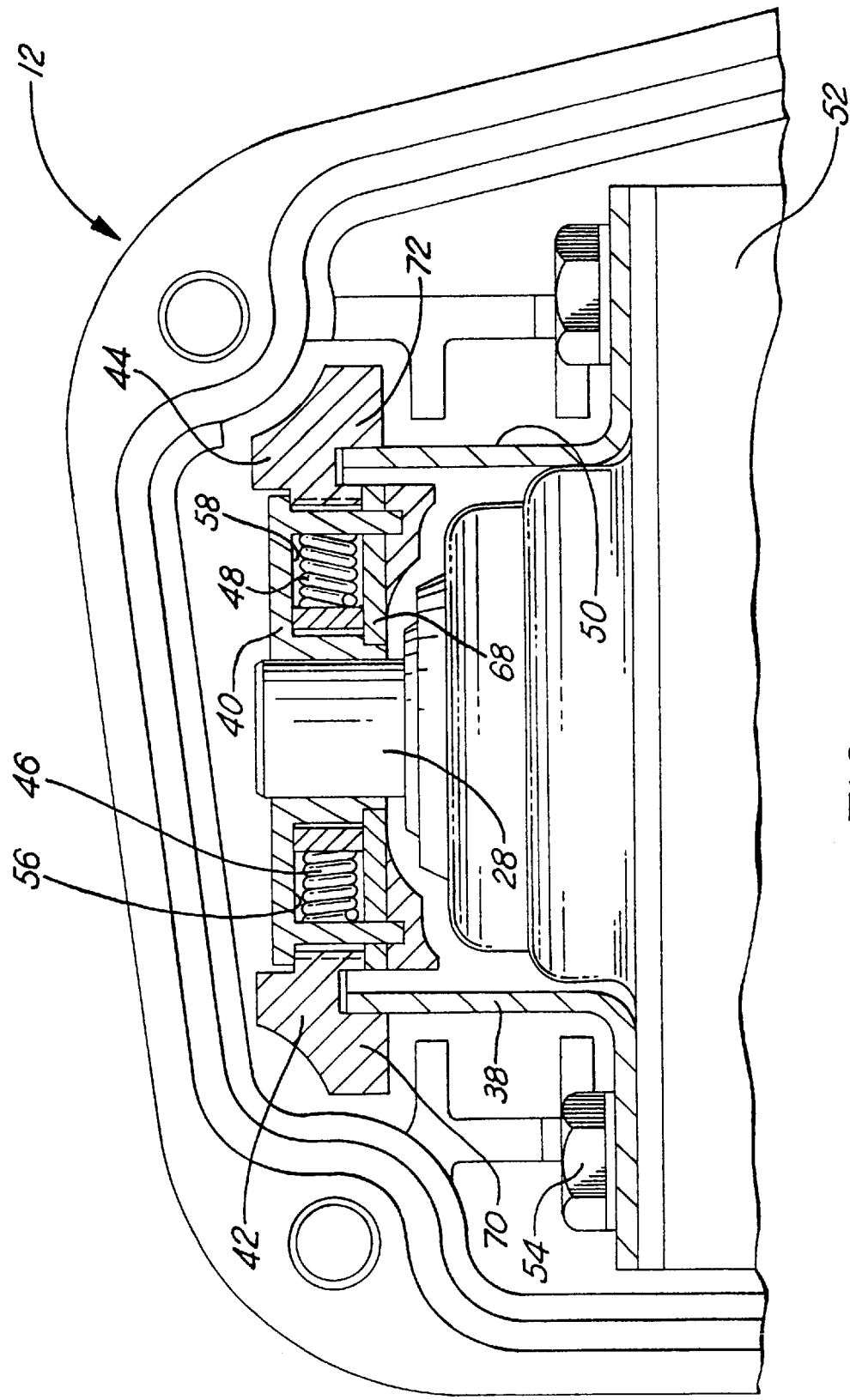
FIG. 3 is a cross-sectional view of the brake of FIG. 2 taken substantially along lines 3—3.

Referring now to FIGS. 2 and 3, brake 12 will be described in greater detail. Brake 12 is provided to allow actuator 10 to hold a predetermined axial load and to prevent "back driving" of actuator 10 while actuator 10 is at rest. Brake 12 includes an annular member, such as a drum 38 or ring, a drive plate 40, brake shoes 42, 44, and means, such as compression springs 46, 48, for urging a portion of brake shoes 42, 44 radially inwardly against drum 38.

Drum 38 is disposed radially outwardly of shaft 28 of motor 14 and provides a radially outer friction surface 50 (best shown in FIG. 3) for engagement by brake shoes 42, 44. Drum 38 is substantially annular in construction and may be made from a variety of conventional materials including conventional metals. Drum 38 may be mounted to motor 14 directly or to a portion 52 of housing 26 that surrounds motor 14 through the use of screws 54, bolts, or other fastening means. Drum 38 may also be integral with housing 26.

Drive plate 40 is provided to position brake shoes 42, 44 and to mechanically restrain, by way of mechanical stops, the radially outward movement of brake shoes 42, 44 upon release of brake 12. Drive plate 40 may be made from a variety of conventional materials including conventional metals. Drive plate 40 may be mounted to shaft 28 for rotation therewith and may include hollows 56, 58 (best shown in FIG. 3) in which compression springs 46, 48 may be disposed. Referring to FIG. 2, plate 40 also includes a plurality of stop flanges 60, 62, 64, 66. Stop flanges 60, 62 may be located at one longitudinal end of drive plate 40 while stop flanges 64, 66 may be located at another longitudinal end of plate 40. Flanges 60, 62 and 64, 66 are provided to restrict the radially outward movement of brake shoes 42, 44, respectively, as described in greater detail hereinbelow. An annular washer 68 may also be provided to hold plate 40 in place.

Brake shoes 42, 44 are provided to prevent the rotation of shaft 28 (i.e., "back driving" of actuator 10) resulting from the presence of an axial load on actuator 10 while actuator 10 is at rest. Brake shoes 42, 44 may be made from a variety of conventional friction materials. Brake shoes 42, 44 are disposed radially outwardly of shaft 28 of motor 14 and may be connected for rotation with shaft 28 through drive plate 40 and springs 46, 48. As shown in FIG. 3, a portion 70, 72 of each brake shoe 42, 44, respectively, is disposed radially outwardly of drum 38. Referring again to FIG. 2, brake shoes 42, 44 are semicircular in shape about their periphery. It should be understood, however, that brake shoes 42, 44 may take on a variety of shapes. Each brake shoe 42, 44 is shaped so as to form a pair of shoulders 74, 76 and, 78, 80, respectively. The radially outward movement of brake shoe 42 is restricted by the engagement of shoulders 74 and 76 with stop flanges 60 and 62, respectively, of drive plate 40. The radially outward movement of brake shoe 44 is restricted by the engagement of shoulders 78 and 80 with stop flanges 64 and 66, respectively, of drive plate 40.

Compression springs 46, 48 are provided to set brake 12 by urging portions 70, 72 of brake shoes 42, 44, respectively, radially inward against surface 50 of drum 38. Compression springs 46, 48, may be made from a variety of conventional materials including conventional metals. Springs 46, 48 may be disposed within hollows 56, 58, respectively, of drive plate 40. Spring 46 may be supported at one end by drive plate 40 and at a second end by brake shoe 42. Spring 48 may be supported at one end by drive plate 40 and at a second end by brake shoe 44.

When actuator 10 is at rest (i.e., when motor 14 is not providing power to move a load), springs 46, 48 urge brake shoes 42, 44, respectively, radially inwardly—causing portions 70, 72 of brake shoes 42, 44 to frictionally engage surface 50 of drum 38. The frictional engagement of brake shoes 42, 44 and drum 38 prevents "back driving" of actuator 10 resulting from forces associated with the axial load—even when actuator 10 incorporates anti-friction bearings. Upon startup of motor 14, shaft 28 begins to rotate. Note that the starting torque of motor 14 must be great enough to overcome the braking effect of brake 12. This rotation imparts a centrifugal force to brake shoes 42, 44. As a result, brake shoes 42, 44 move radially outwardly and portions 70, 72 of brake shoes 42, 44 disengage surface 50 of drum 38. In this manner, brake 12 is released without the friction brake drag associated with conventional brakes. Brake shoe 42 continues to move radially outwardly until shoulders 74 and 76 of brake shoe 42 engage stop flanges 60 and 62 of drive plate 40. Similarly, brake shoe 44 also continues to move radially outwardly until shoulders 78 and 80 of brake shoe 42 engage stop flanges 64 and 66 of drive plate 40.

The relatively simple construction of brake 12 means that brake 12 is less costly than conventional brakes and requires fewer parts than conventional brakes. In addition, the operation of brake 12 is less complex and more efficient than conventional brakes—particularly those that utilize electrical power to release the brake. Most importantly, the construction of brake 12 makes it particularly suitable for those actuators than incorporate anti-friction bearings because brake 12 is able to hold a significant axial load and yet is able to fully release upon startup of the actuator's motor without a significant friction brake drag that would otherwise add to the load of the motor.

While the invention has been particularly shown and described with reference to the preferred embodiments thereof, it is well understood by those skilled in the art that various changes and modifications can be made in the invention without departing from the spirit and scope of the invention.

I claim:

1. A brake, comprising:
   an annular member disposed radially outwardly of a shaft;
   a first brake shoe disposed radially outwardly of said shaft and connected to said shaft for rotation therewith, said first brake shoe having a first portion disposed radially outwardly of said annular member; and,
   means for urging said first brake shoe radially inwardly so that said first portion engages a radially outer surface of said annular member
   wherein rotation of said shaft by a motor imparts a centrifugal force to said first brake shoe thereby causing said first brake shoe to move radially outwardly so that said first portion disengages from said radially outer surface of said annular member.

2. The brake of claim 1, further comprising a drive plate mounted to said shaft for rotation therewith.

3. The brake of claim 2 wherein said drive plate includes a first hollow and said urging means is disposed within said first hollow.

4. The brake of claim 2 wherein said drive plate includes a first stop flange that restricts radially outward movement of said first brake shoe.

5. The brake of claim 1, further comprising a second brake shoe disposed radially outwardly of said shaft.

6. The brake of claim 1 wherein said annular member is mounted to said motor.

7. The brake of claim 1 wherein said urging means includes a first compression spring.

8. A brake, comprising:

an annular member disposed radially outwardly of a shaft;

a drive plate disposed radially outwardly of said shaft and mounted to said shaft for rotation therewith;

a first brake shoe disposed radially outwardly of said shaft and having a first portion disposed radially outwardly of said annular member; and, a first compression spring supported at one end by said drive plate and at a second end by said first brake shoe wherein said first compression spring urges said first brake shoe radially inwardly so that said first portion engages a radially outer surface of said annular member and rotation of said shaft by a motor imparts a centrifugal force to said first brake shoe thereby causing said first brake shoe to move radially outwardly so that said first portion disengages from said radially outer surface of said annular member.

9. The brake of claim 8, further comprising:

a second brake shoe disposed radially outwardly of said shaft; and, a second compression spring supported at one end by said drive plate and at a second end by said second brake shoe.

10. The brake of claim 8 wherein said drive plate includes a first hollow in which said first compression spring is disposed.

11. The brake of claim 8 wherein said drive plate includes a first stop flange that restricts radially outward movement of said first brake shoe.

12. The brake of claim 8 wherein said annular member is mounted to said motor.

13. A linear actuator, comprising:

a motor having a shaft extending therefrom;

means, responsive to rotation of said shaft, for axially moving a load;

a drive plate mounted to said shaft for rotation therewith;

an annular member disposed radially outwardly of said shaft;

a first brake shoe disposed radially outwardly of said shaft and having a first portion disposed radially outwardly of said annular member; and, a first compression spring supported at one end by said drive plate and at a second end by said first brake shoe wherein said first compression spring urges said first brake shoe radially inwardly so that said first portion engages a radially outer surface of said annular member and rotation of said shaft by said motor imparts a centrifugal force to said first brake shoe thereby causing said first brake shoe to move radially outwardly so that said first portion disengages from said radially outer surface of said annular member.

14. The linear actuator of claim 13, further comprising:

a second brake shoe disposed radially outwardly of said shaft; and, a second compression spring supported at one end by said drive plate and at a second end by said second brake shoe.

15. The linear actuator of claim 13 wherein said drive plate includes a first hollow in which said first compression spring is disposed.

16. The linear actuator of claim 13 wherein said drive plate includes a first stop flange that restricts radially outward movement of said first brake shoe.

17. The linear actuator of claim 13 wherein said moving means includes a ball bearing lead screw.

* * * * *